United States Patent
Petrov et al.

(10) Patent No.: US 7,035,097 B2
(45) Date of Patent: Apr. 25, 2006

(54) 3.5 INCH HOT-SWAPPABLE DOCKING MODULE

(75) Inventors: Peter D. Petrov, Sunnyvale, CA (US);
Stefan H Kalintchev, St. Zagora (BG);
Ivan M Parushev, St. Zagora (BG);
Ivan G Dimov, St. Zagora (BG);
Lubomir T Dimitrov, St. Zagora (BG)

(73) Assignee: DZU Technology Corporation, Sunnyvale, CA (US)

( * ) Notice: Subject to any disclaimer, the term of this patent is extended or adjusted under 35 U.S.C. 154(b) by 180 days.

(21) Appl. No.: 10/714,136

(22) Filed: Nov. 13, 2003

(65) Prior Publication Data
US 2005/0105265 A1 May 19, 2005

(51) Int. Cl.
*G06F 1/16* (2006.01)
(52) U.S. Cl. .................. 361/685; 360/137; 369/76
(58) Field of Classification Search ........... 361/685; 29/603.04; 369/75.1, 75.2, 76, 77.1, 77.2, 369/78–82; 360/98.01, 137
See application file for complete search history.

(56) References Cited

U.S. PATENT DOCUMENTS

| | | | |
|---|---|---|---|
| 5,392,192 A * | 2/1995 | Dunn et al. .................. 361/683 |
| 5,483,419 A | 1/1996 | Kaczeus | |
| 5,777,845 A * | 7/1998 | Krum et al. ................. 361/685 |
| 6,052,278 A * | 4/2000 | Tanzer et al. ............... 361/685 |
| 6,188,571 B1 * | 2/2001 | Roganti et al. ............. 361/685 |
| 6,247,944 B1 * | 6/2001 | Bolognia et al. ........... 439/157 |
| 6,373,695 B1 * | 4/2002 | Cheng ........................ 361/685 |
| 6,836,406 B1 * | 12/2004 | Weng et al. ................ 361/685 |
| 6,856,508 B1 * | 2/2005 | Rabinovitz .................. 361/685 |
| 6,918,174 B1 * | 7/2005 | Kim et al. ............... 29/603.04 |

* cited by examiner

*Primary Examiner*—Lisa Lea-Edmonds
(74) *Attorney, Agent, or Firm*—S. Alex Liao

(57) ABSTRACT

A docking module for conventional small form factor disk drives provides, in one embodiment, space for two such disk drives embedded in tray loaders, within a standard 3.5 inches halve height floppy bay. The docking module provides hot swappable insertion and removal of tray loaders together with disk drives. The bay is provided within a housing member. A button attached to a lever mechanism disconnects the docking module connector from the tray loader connector and partially pull out the loader when the button is pushed; An EMI shield fixedly coupled to the tray loaders each provide a barrier to electromagnetic interference.

10 Claims, 10 Drawing Sheets

3.5 INCH HOT-SWAPPABLE DOCKING MODULE

FIELD OF THE INVENTION

This invention relates to computer equipment, disk drives generally, and particularly relates to docking modules for conventional small form factor disk drives.

BACKGROUND OF THE INVENTION

Computer systems and information networks today require tremendous amounts of data storage. Personal Computer ("PC") users need to add extra storages, to back up files, to transport large files and to have a portable, personalized environment. Modem mass storage users need to place their personal data and environment on an easy transportable device, thereby enhancing mobility and system flexibility. Rich multimedia content drives the need for larger, faster and smaller disk drives. New means of transporting large files are desired. In the corporate world, users exchange a mobile hard disk drive between a deck top and a mobile system for travel. The same device could be carried to another site and used in a virtual office/shared PC environment.

Many computer systems, including PC, workstations, servers, and embedded systems are designed to have multiple disk drives included in the system. To increase the reliability, there is a need for failed disk drives to be serviced by removing or hot-swapping the device to an operable computer system, and repairing the broken system online.

Different approaches are used to achieve these goals. A conventional approach is to use a tape drive, removable disk drives, floppy disks or removable drawers with embedded disk drives. A typical approach for large data file backup is a tape drive providing archival storage. In modem PC applications high capacity ZIP and JAZ drives are used. Over the past ten years optical magnetic media also was used for back up and archival storage.

High-end systems, such as servers are using RAID technology to store and back up files. RAID systems are designed to provide high capacity data storage with built-in reliability. The systems incorporate a degree of redundancy into the storage mechanism to permit saved data to be reconstructed in the event of single (or more) disk drive failure within disk array. For this purpose a limited quantity of removable dick drives and 5.25" hot-swap drawers are in use.

There is no universal approach for different applications. All approaches have numerous difficulties. Tape drives has been perceived to be a less expensive back - up for many years. The main disadvantage of magnetic tapes is that data read/write operations are too slow compared to hard disk drives. Tape drives are so large and slow that they are suitable only for large archives and librarys.

Floppy disks, because of their relatively limited data storage capability, cannot be used to store large amounts of data. Thus, if a large amount of data is to be transferred from the hard disk drive of a computer, more than a single floppy disk may be required. This increases expenses, tends to be labor-intensive, and requires excessive storage space.

Hard disk drives are generally known to provide exceptionally rapid data storage and retrieval, as well as high levels of storage capacity. The conventional hard disk drives are permanently mounted in system cabinets. There are several ways to use them as a back up devices. One of the ways is known to provide mirrored drives, in which two functionally identical drives are installed with one drive serving as the back up to the other drive. Permanently installed drives offer little portability. To move the data from one PC to another the power have to be down, the disk drive has to be disconnected and transported to another PC. This operation is time consuming and unhandy. In many systems the mirrored disk drives are mounted in a removable drawers and in the event of failure the disk drive can be disconnected and removed without power down. The embedded conventional drives in the removable drawers are usually 3.5 inch form factor, mounted in 5.25 inch full or halve height drawers. The drives and drawers are too large, heavy, need too much space and also offer limited portability. These disadvantages can be solved by small form factor, high capacity disk drives providing the portability advantages inherent in floppy disks, without sacrificing the data storage capacity of hard disk drives.

Removable media drives like Iomega ZIP and JAZ drives are known in the industry, and offer some limited success in overcoming a few of the foregoing limitations of conventional prior art systems. For example, SyQuest Technology offers cartridge drives in which the media can be removed from the remainder of the drive. While this approach does offer the ability to expand the capacity of a drive, the media in a SyQuest cartridge is readily exposed to the environment and can easily become contaminated from such exposure, rendering the cartridge useless. In addition, Bernoulli drives offer removable media, but suffer from slow access time and limited reliability. In addition, none of these devices can be readily hot swapped, and each of them has, historically, taken up at least a 5.25 inch half-height drive bay for a single device. Importantly, the limited storage capacity of these devices makes them unsatisfactory as a primary drive or, in at least a number of cases, a backup device.

Removable disk drives are also well known in the industry. The assignee of the present invention has offered a solution to some of the foregoing limitations of the prior art. The U.S. Pat. No. 5,483,419 entitled "Hot-Swappable Multi-cartridge Docking Module", describes a docking module for a number of removable hot-swappable disk drives with sufficient capacity to be installed in a computer cabinet as either a primary and secondary drive, or a backup devices. Moreover, the docking module offers relatively fast access times, unlimited expansion of total capacity through the use of multiple drives, and portability. The device disclosed there includes a means for hot swapping of drives, e.g., exchanging drives while the system is still operating without the loss of data, and it also provides two disk drives per 5.25 inch half-height bay. The main disadvantage there is that there are not too many available removable disk drives on the market.

Development of the disk drive technology and I/O interfaces has created smaller, slimmer and cheaper high capacity disk drives. A lot of companies are manufacturing 2.5 inch high capacity /10 to 80 GB / pocket drives. The I/O Serial ATA interface incorporated in these disk drives make them very suitable, as hot-swappable, removable devices. As a result, there has been a need for smaller 3.5 inch hot-swappable docking modules, which improve upon the foregoing limitations of the prior art.

SUMMARY OF THE INVENTION

The present invention solves the above and other problems, by providing a 3.5 inch halve height docking module with hot-swappable small form factor, high capacity, disk drives embedded in tray loaders.

The invention in first embodiment, includes 3.5 inch halve height docking module having two thinner drive bays, each capable of receiving a tray loader with embedded 2.5 inch IDE/ATA or Serial ATA disk drives. In addition, an IDE/ATA or Serial ATA bus arrangement is provided so that either or both of the drives can be added or removed from the system without requiring the rest of the system to be shut down.

Further, a positive insertion and removal structure is provided for ensuring that the drives are fully and correctly inserted and for simplifying the removal of a drive from the module. The insertion and removal structure cooperates with the PCBA back plane to assist in providing the hot swappability mentioned above, by causing power to be disconnected to the drive before the drive is actually disconnected from the backplane connector of the drive module.

A general object of the present invention is to provide a 3.5 inch halve height-docking module, which provides hot-swappability of small, form factor disk drive within a computer system.

It is another object of the present invention to provide a docking module having the capacity for multiple thin disk drives within the space of a half-height 3.5 inch bay.

It is a further object of the present invention to provide a docking module capable of supporting a plurality of disk drives each embedded in tray loader at a density of at least two loaders per 3.5 inch half-height bay.

It is a still further object of the present invention to provide a means for positive insertion and removal of a disk drive from a bay within a docking module.

These and other objects, advantages aspects and features of the present invention will be more fully understood and appreciated upon consideration of the following detailed description of preferred embodiments in conjunction with the accompanying drawings.

DETAILED DESCRIPTION OF THE INVENTION

Figure 1:
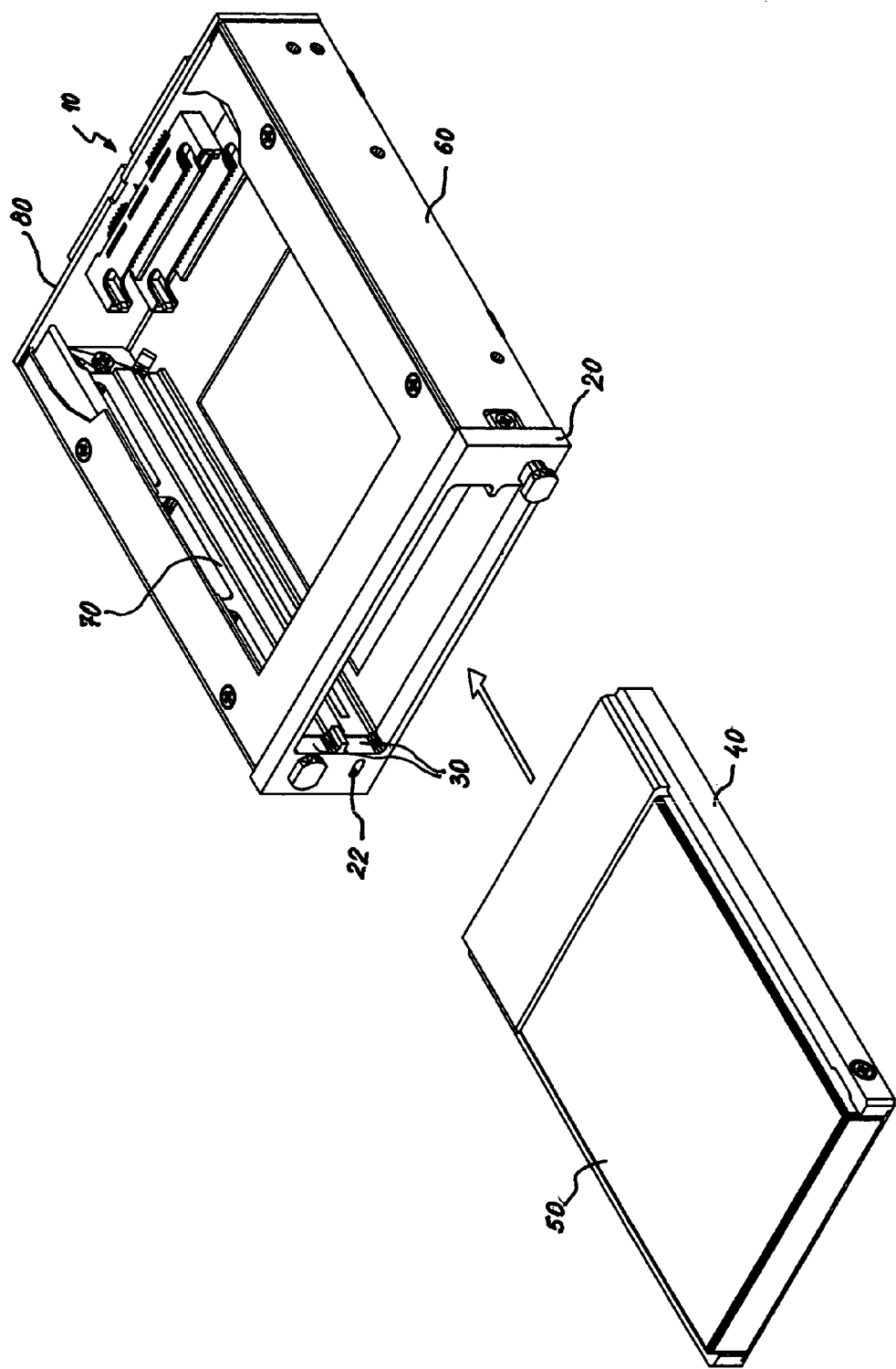
FIG. 1 is perspective view of a two-drive docking module in accordance with the first embodiment of the present invention.
Figure 2:
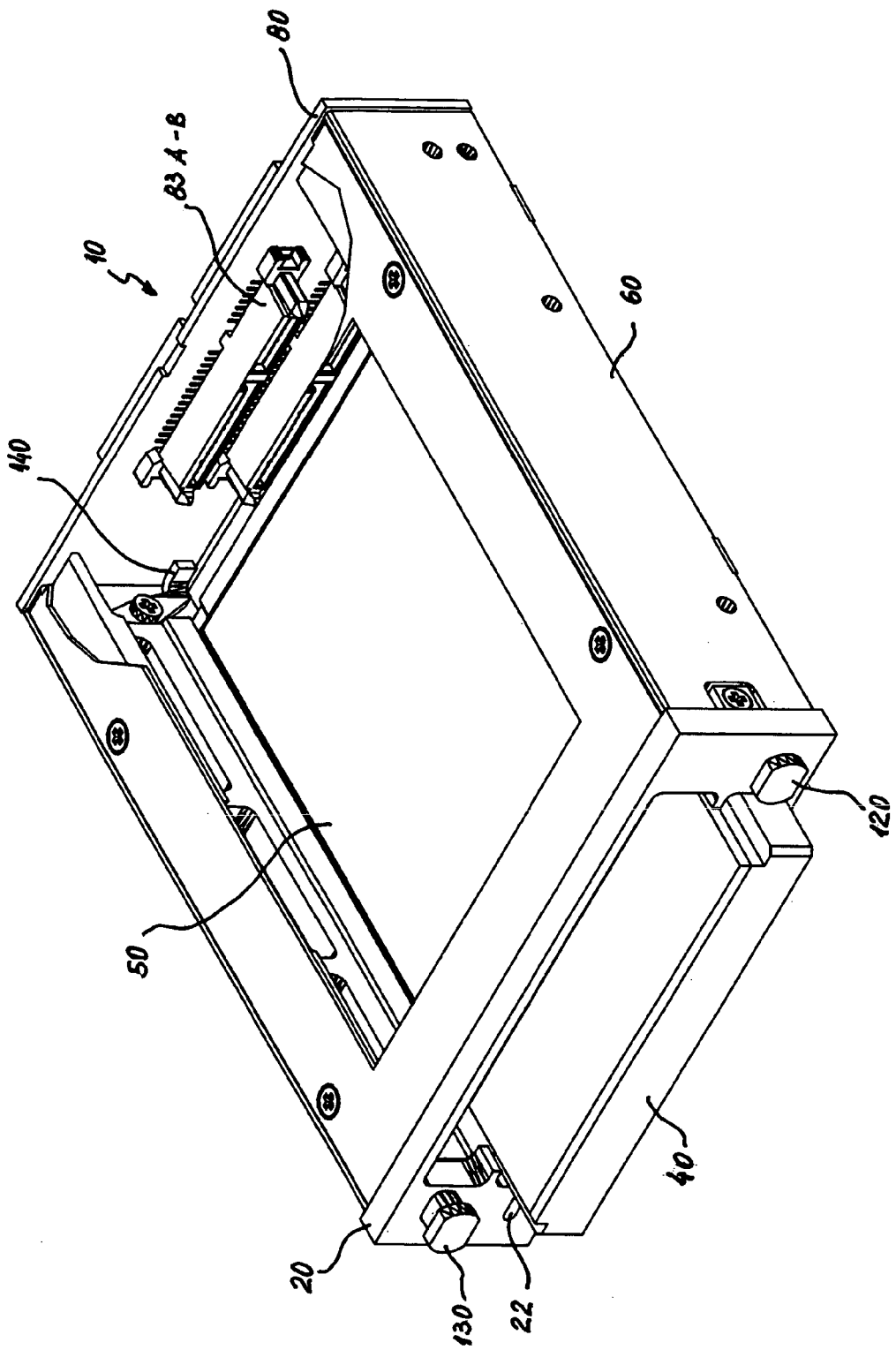
FIG. 2 is perspective view of a two-drive docking module in accordance with the second embodiment of the present invention.

"Referring initially to FIGS. 1 and 2, a 3.5 inch half-height docking module 10, is shown for holding two tray loaders 40 with embedded small form factor disk drives 50. The docking module is designed to be installed within housing such as a computer chassis or an external housing (not shown). It is to be understood that the docking module 10 fits snugly within a standard-sized 3.5 inch form factor cavity of deck top personal computers. The tray loaders 40 have a nominal width up to 2.75 inches and a nominal depth up to 4 inches and a nominal height up to 0.8 inches. These dimensions of tray loaders are the applicants own trial data and are not necessarily any industry data."

As appreciated in reference to FIGS. 1 and 2, the portable tray loader 40 with the embedded disk drive can be manually inserted into the docking module 10 and held in operable engagement with the personal computer. When the tray loader 40 with the disk drive is operably engaged with the docking module 10, data can be stored on the disk drive by the user of the computer system. Then, the tray loader 40 with hard disk drive can be ejected by means of the push button 120 or 130 from the docking module 10 and transported to another location for storage or use.

Figure 3:
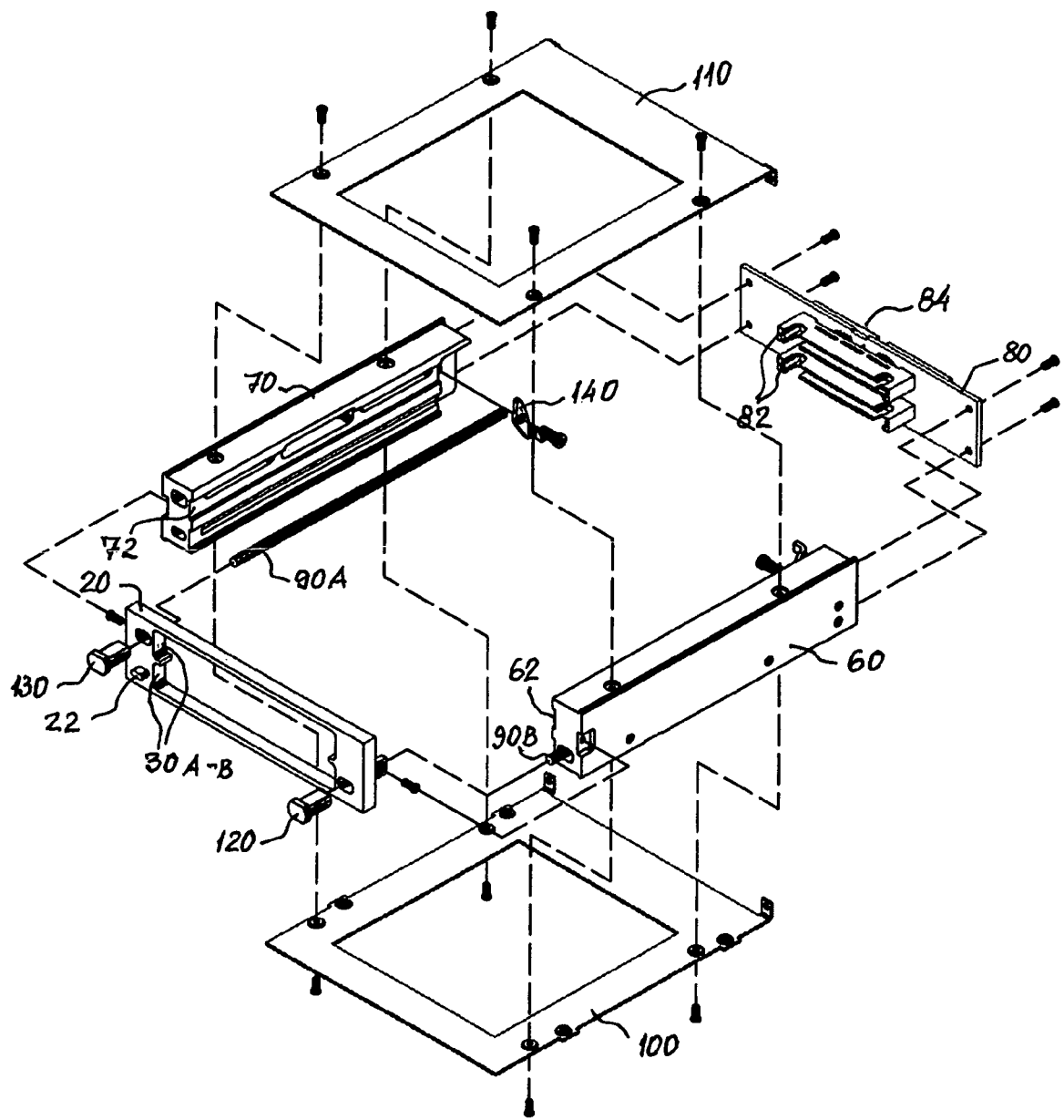
FIG. 3 is an exploded perspective view of a two-drive docking module of FIG. 1.

In cross-reference to FIGS. 1 and 3, the docking module includes a front panel 20 with two slots 30. The open slot 30 is suitable for receiving a tray loader 40 with embedded disk drive. The tray loader 40 is inserted through the front panel slots into a pair of guides 60 and 70, which are supported by a base 100, enclosed at the top by a cover 110. The base 100 supports at the back thereof, a printed circuit board 80. The guides 60 and 70 extend from the front panel to the printed circuit board 80. Two connectors 82A–B situated on the back plane PCB 80, are designed to mate with a connector 48 (FIG. 4) on the abutting part of the tray loader to provide power to the drive and communications between the PCB 80, a conventional host system (not shown) and the drive 50.

Each of two push buttons 120 and 130 is connected to an associated slide 90A or 90B. The slide 90 in turn moves within a guide channel 62 or 72 in the guides 60 and 70. The back end of the slide, positioned near to the associated pawl 140 suppress the pawl and extends out the tray loader 40 when the associated button 120 or 130 is pushed.

Figure 4:
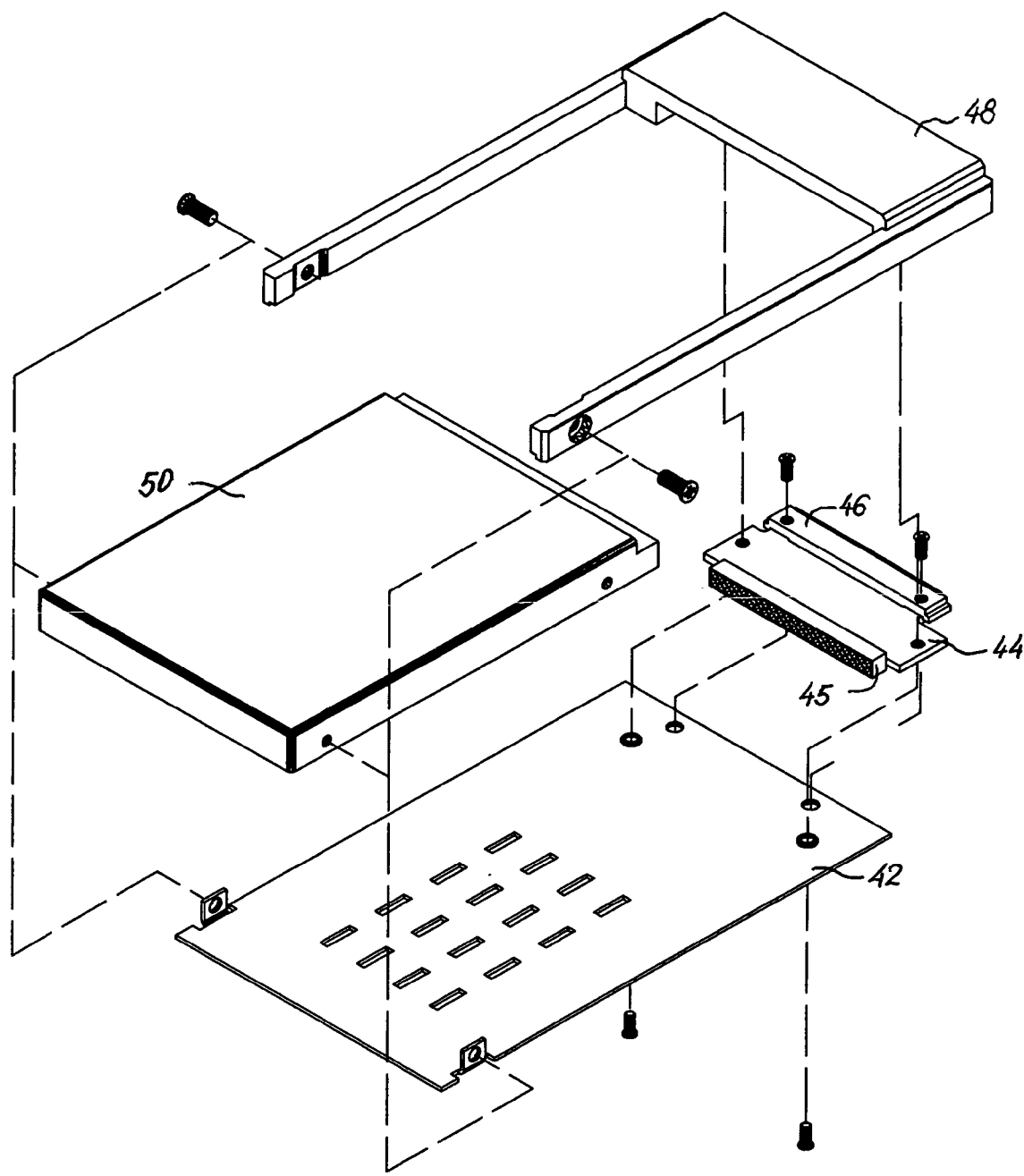
FIG. 4 is an exploded perspective view of the tray loader in accordance with the first embodiment.

As shown in FIG. 4, the tray loader in the first embodiment includes EMI shield 42, Link PCBA 44 with two connectors (45, 46), small form factor IDE disk drive 50 and plastic cover 48. The EMI shield serves to support the conventional disk drive 50 and Link PCBA 44. It also prevents electromagnetic influence between the disk drives in the docking module.

The Link PCBA 44 is mounted on the EMI shield 42 and serves to connect electrically the disk drive 50 with the host. The first connector 45 is 44-pole socket IDE connector, well known in the industry. The second one 46 is a special multi-insertion 50-pole socket PC MIDI connector similar to the so-called PCMCIA connectors. Both connectors are assembled on the link PCB. The plastic cover 48 is covering the PCBA, fixing the disk drive to the EMI shield and serves as a slide of the tray loader.

As best seen from FIG. 3, the printed circuit board 80 in the first embodiment of the docking module may be better appreciated. There are two pin connectors 82A and 82B on the front side of the board. The connectors are multi-insertion 50 pin PC MIDI connectors. The connector pins has three different lengths. They enable a power-up delay between the time when power is applied to the drive and the time when the bus is enabled, to allow the drive to spin up and reach a stable state before the bus is enabled. When the drive 50 is inserted manually through the slot 30 and into the guides 60 and 70, it is gently plugs into the connector 82 on the PCB 80. By using pins of three different lengths, with the power supply pins being longest, the bus pins being shorter, and the drive output pins the shortest, the power supply connection is made first, with the remaining connections being made at appropriate subsequent times. Momentarily after the short pin connection is made, the host system recognizes the installation of the drive 50. It will be appreciated that, when the drive is moving into the connector 82 it is pushing the pawl 140. The pawl 140 is rotated and suppresses the slide 90, causing movement of the slide 90 and push button outdoors.

When removing the drive, a user needs to push the button 120 or 130 and cause the slide 90A or 90B to move towards the appropriate pawl 140. The pawl is rotated, suppresses the back end of the drive, and removes the tray loader 40 from the PC MIDI connector 82.

An important feature of the present invention is the capability for adding and removing drives while the host system is operating. This feature is called "hot swappability" and is well known in the industry. In the first embodiment FIGS. 1 and 3 of the current invention, this feature implementation is based on keeping the drive in RESET condition while it is inserted or ejected. Thus the drive interface buffers are kept in high Impedance State so no data corruption can occur on the host system bus while the drive's power supply voltage may become unstable. In order to achieve this goal, a simple electronic circuit is implemented on the back panel PCB and a special design of the 50-pole PC MIDI pin connectors 82A and 82B with three different pin lengths is used. All power supply voltage lines and the reset lines are tied to the long pins of the PC MIDI connectors 82A and 82B. All interface lines (except RESET) are tied to middle length pins of the PC MIDI connectors 82A and 82B and the DEV_ENA signals 160A and 160B are tied to the short pin 37 of the corresponding PC MIDI connector 82A and 82B.

Figure 7A:
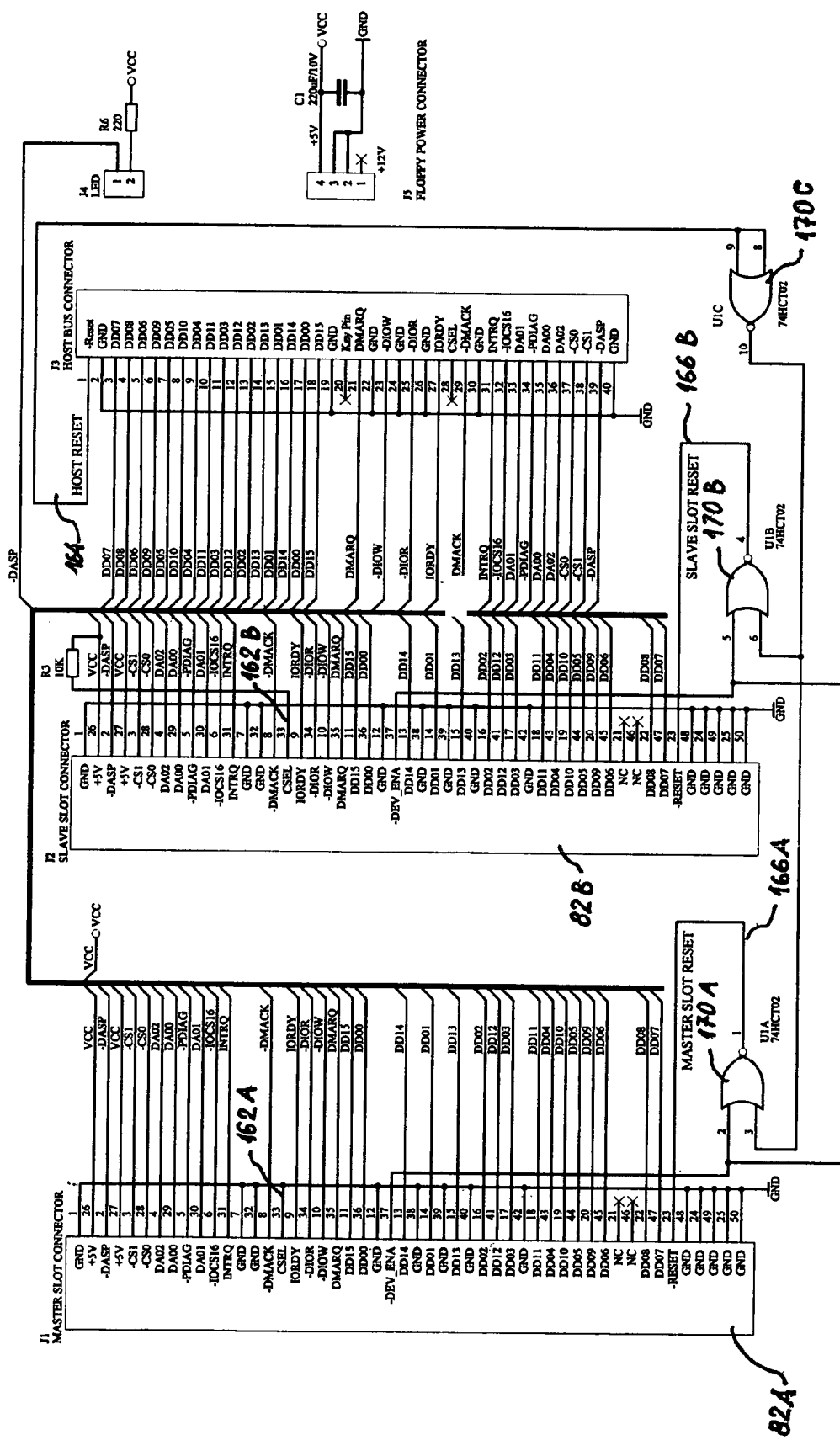
FIG. 7A–B is a schematic block diagram forming the circuitry for providing hot swappability of the drive of FIG. 1.
Figure 7B:
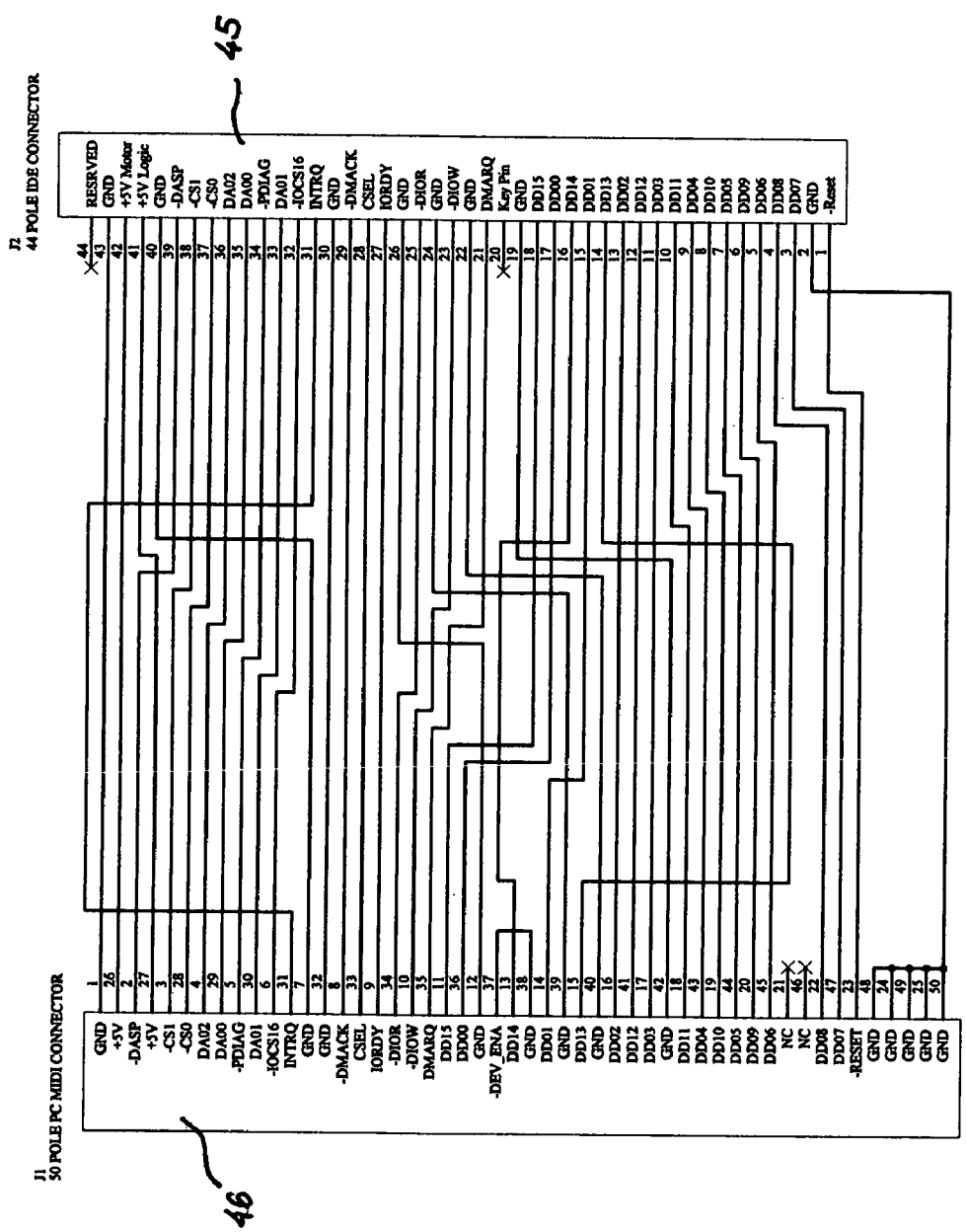

Referring to FIG. 7B the Link PCB circuit is shown. It can be easily seen that this PCB provides a direct connection for all interface signals between 44-pole IDE connector 45 and 50-pole PC MIDI connector 44.

Referring to FIG. 7A the back plane PCB electronic circuit is shown. This circuit includes a bus connector 84 for connection to the IDE bus of the host system (not shown) in a conventional manner. In contrast, each of two tray loaders with embedded HDD connects to either PC MIDI connector 82A and 82B. For purposes of the discussion, connector 82A will be defined as the master connector, while connector 82B will be defined as the slave connector, as required by the CSEL signal 162A being tied low for the master and CSEL signal 162B tied high for the slave connector.

As seen on FIG. 7A, almost all remaining interface signals are directly tied signals from the bus connector 84 to the corresponding signal pins of both master and slave connectors 82A and 82B except the host RESET signal 164. By implementing three NOR 74HCT02 gates 170A–170C the master and slave RESET signals 166A and 166B are asserted when either the host RESET signal 164 is asserted (driven low) or the DEV_ENA signal 160A–B on pin 37 of the corresponding PC MIDI connector 82A–B is high level.

For the purposes of simplicity, insertion and removal of a tray loader into the master slot will be explained; insertion and removal of a tray loader into the slave slot involves identical components and operates in the same way.

Let us assume now a tray loader 40 with embedded HDD 50 is being inserted into the docking module master slot 30A. When the tray loader 40 approaches the backplane PCB, all long pins of the master PC MIDI connector 82A make contact first and thus the HDD is powered and the master slot RESET signal 166A is tied to the HDD as well. Referring now to FIG. 7A it can be noticed the master slot RESET signal 166A is asserted (low level) at this time as long as the master DEV_ENA signal on pin 2 of the 74HCT02 NOR gate 170A is tied high through resistor R4 168. Thus the HDD 50 is put in reset condition and its interface buffers are in high Impedance State. As the tray loader insertion process continues, the middle length pins of the master slot PC MIDI connector 82A make contact next and the HDD interface buffers are connected to IDE bus of the host system. At this time the master slot RESET signal 166A is still asserted and the HDD interface buffers are kept in high Impedance State. A short moment before the tray loader insertion is completed, the short pin 37 of the master slot PC MIDI connector makes contact.

Referring now to FIG. 7B, the pins 37 and 38 of the Link PCB PC MIDI socket connector 46 are short-circuited. Thus pins 37 and 38 of the back plane PCB master slot PC MIDI connector 82A become tied to each other and the master DEV_ENA signal 160A on pin 2 of the 74HCT02 NOR gate 170A is connected to the signal ground. When the host system RESET signal 164 is not asserted at this time, the master slot RESET signal 166A is negated and the HDD embedded into the master slot tray loader is no longer kept in reset condition.

Once the drive is installed into the system, the system recognizes the drive in the conventional manner, with the exception that the device driver always assigns a drive letter to a slot, whether or not a disk is present. The device driver further provides a software interrupt looking for a drive to be installed in an empty slot. Once a drive is detected by the system, the software interrupt causes the device driver to do a device inquiry command. The drive 50 responds with configuration of heads, cylinders and sectors, which allow the IDE interface with the host to address it. The system then can automatically address the drive and its data without rebooting and during the operation, the drive 50 operates as a conventional HDD.

When the tray loader 40 is ejected essentially the reverse sequence of the insertion takes place. As soon as the tray loader begins to move out of the docking module, the pin 37 of the master slot PC MIDI connector 82A is disconnected. Then the signal on pin 2 of a 74HCT02 NOR gate 170A goes to a high level and hence the master slot RESET signal 166A is asserted. This puts the drive interface buffers in high Impedance State and prevents the host system bus data of corruption. When the ejection continues, the middle length pins of the master slot PC MIDI connector are disconnected next and the drive interface buffers are physically disconnected from the host system bus while the master slot RESET signal 166A is still connected to the drive. Since the drive power supply lines and the RESET signal are tied to the long pins of the PC MIDI connector, they are last disconnected during the ejection process.

Figure 5:
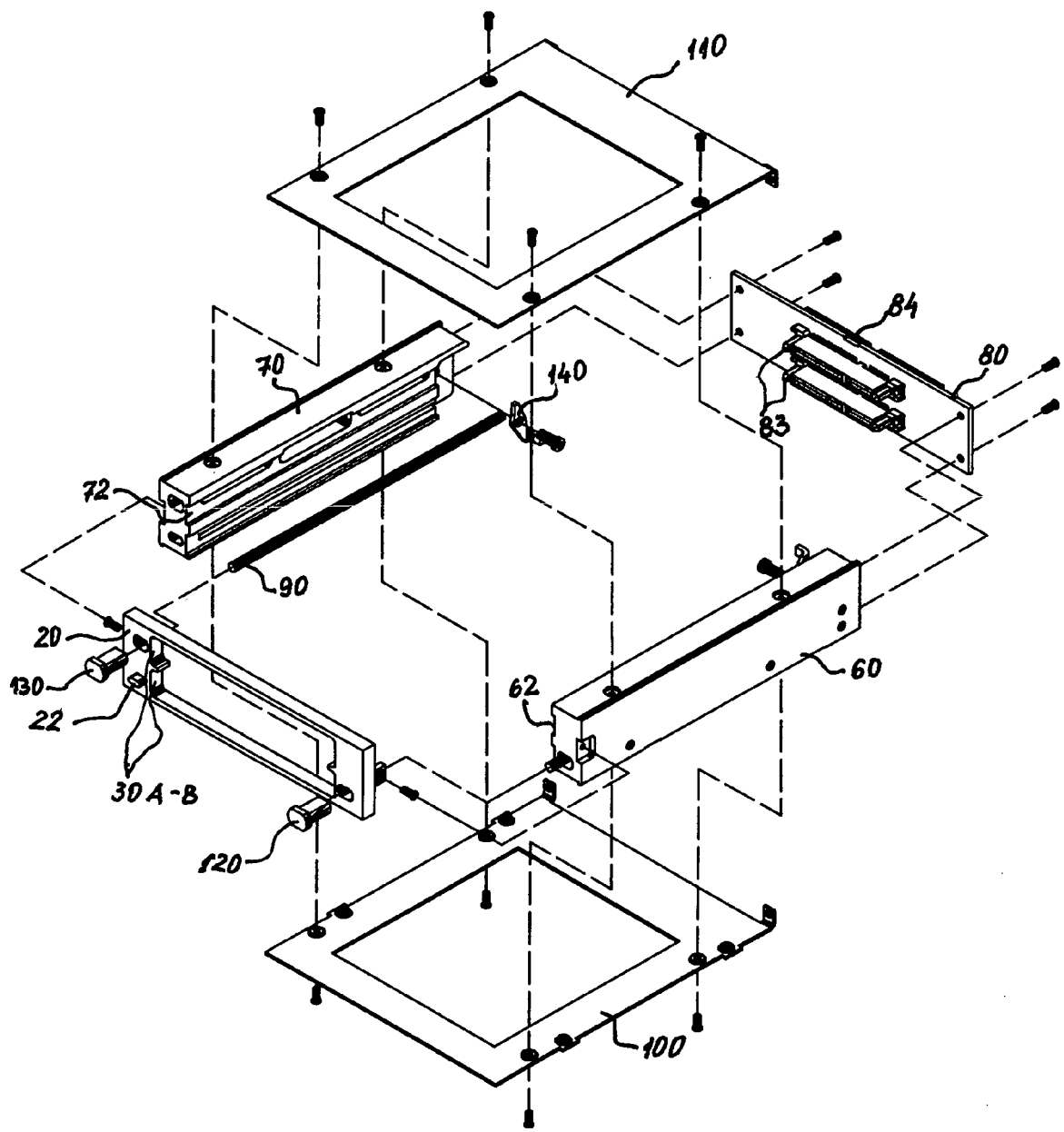
FIG. 5 is an exploded perspective view of a two-drive docking module of FIG. 2.
Figure 6:
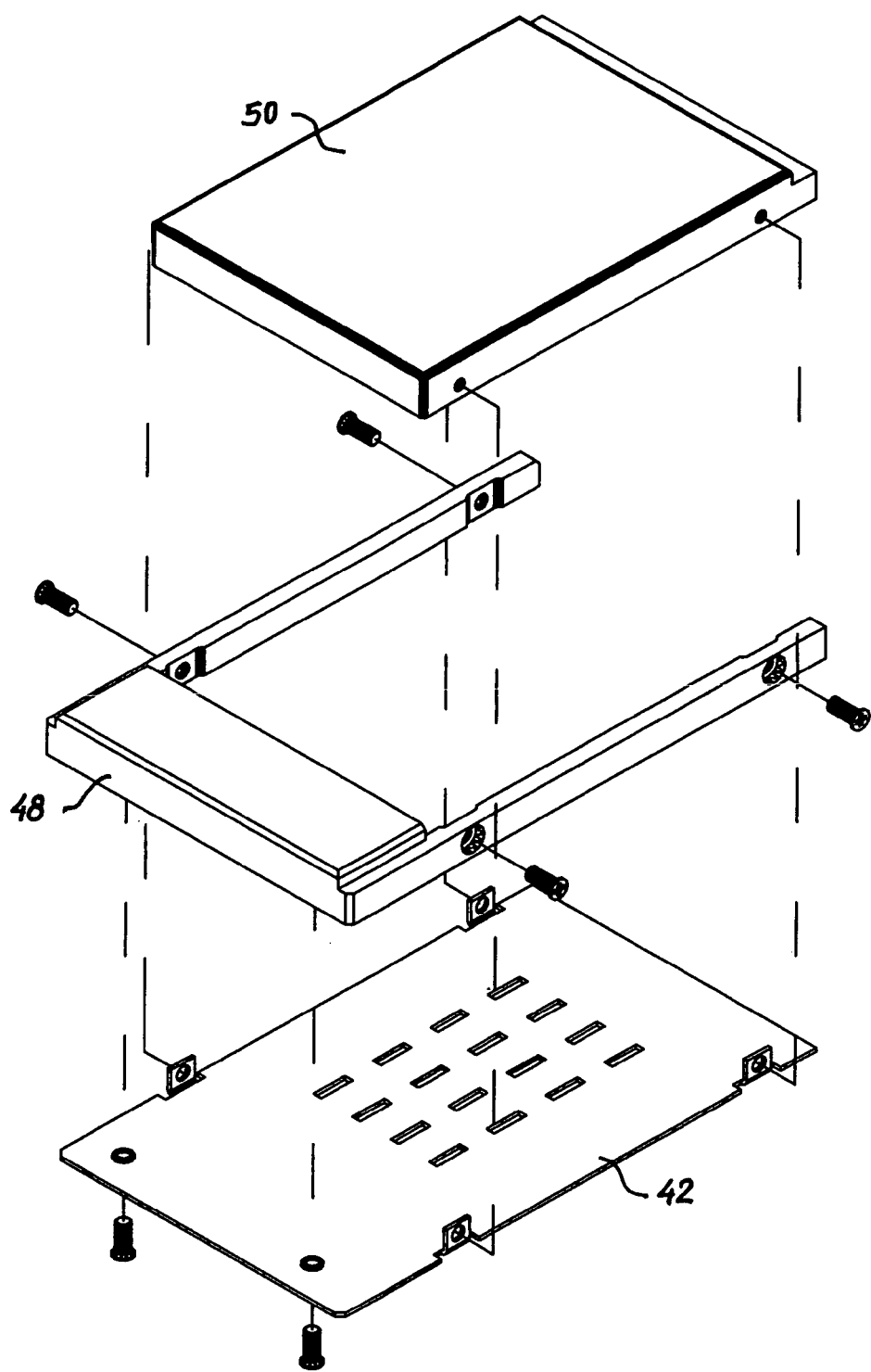
FIG. 6 is an exploded perspective view of the tray loader in accordance with the second embodiment.

In another embodiment of the present invention as shown on FIG.2 and 5, another type of tray loader 40 and back plane connectors 83 are in use. The back plane connectors 83 are multi-insertion Serial ATA connectors. The tray loader as shown in FIG. 6, includes EMI shield 42, small form factor Serial ATA disk drive 50 and plastic cover 48. There is a direct connection between the disk drive and the host. In this case a special multi-insertion Serial ATA plug connector is embedded in the disk drive. The used Serial ATA connector and interface provide the opportunity for disk drives to be hot swappable and inserted directly into receptacles. Serial ATA includes all the mechanical and electrical features necessary to allow disk drives to be inserted into receptacles while the system is powered, and the protocol ensures that disk drive discovery and initialization are handled.

Referring further to FIG. 2, buttons 130 and 120 are engaged in a lever mechanism, which is well-known in the art. When the button 120 or 130 is pressed, one tray loader 40 is disengaged from the connector 83 or the host and ejected from the docking module 10.

Figure 8A:
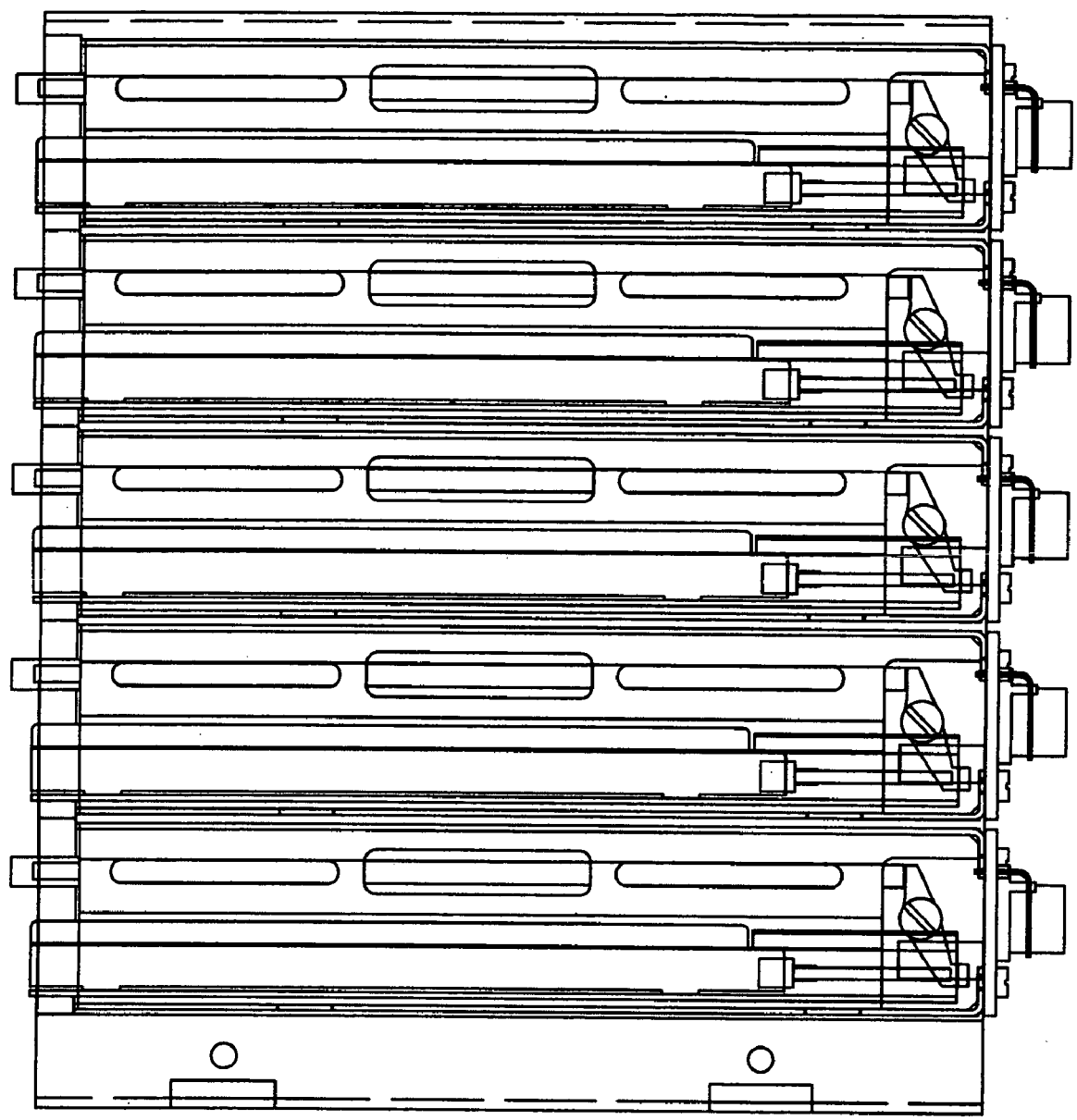
FIG. 8 shows an alternative embodiment of a docking module for use with ten drives (fife dual docking modules in housing)
Figure 8B:
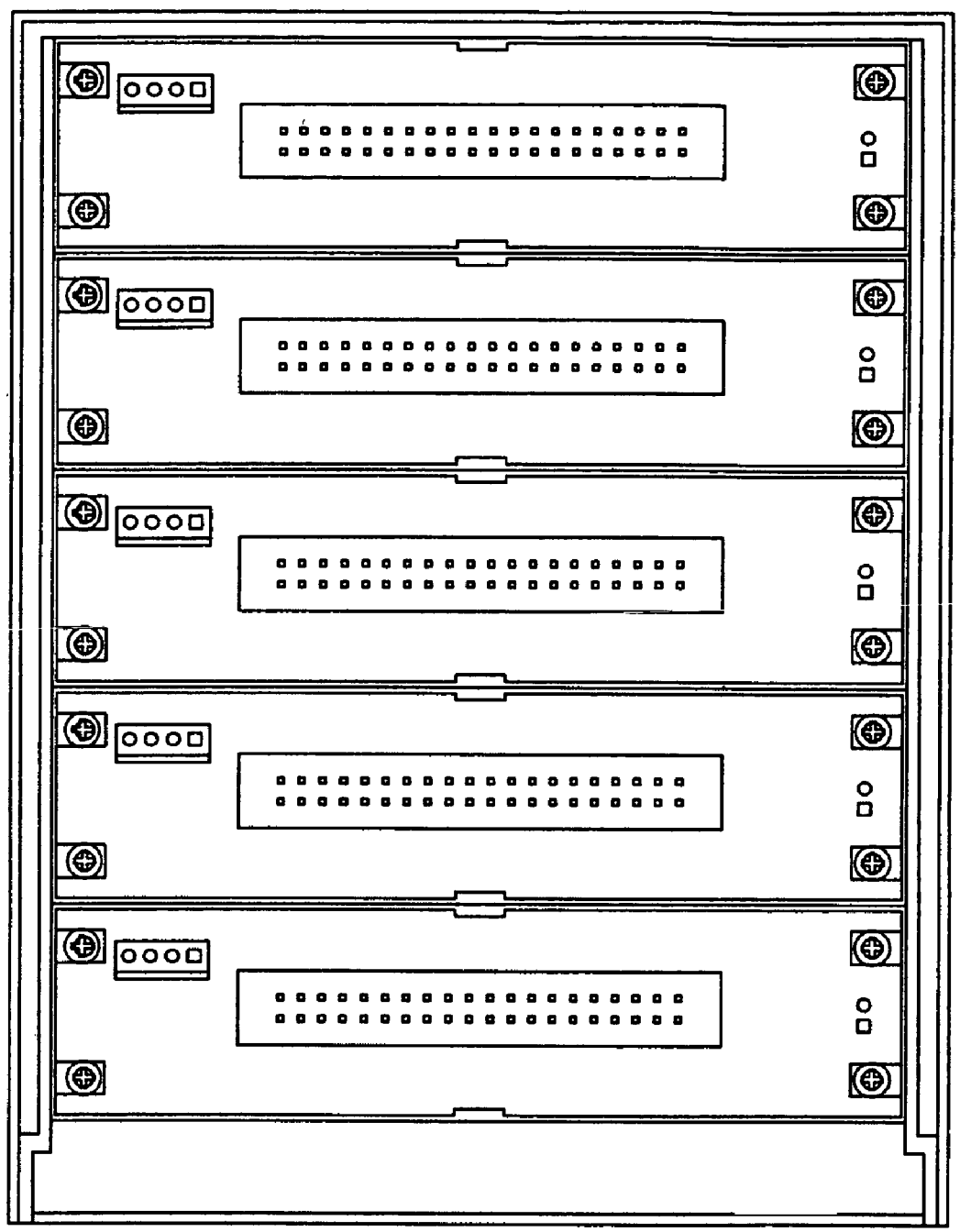

Referring next to FIGS. 8A–8B, an alternative embodiment to the design of FIGS. 1 and 2 may be better understood. FIG. 8A is a side elevation view of a docking module 200 capable of holding five docking modules 10; FIG. 8B is a front view of the same module; each has certain internal components shown for clarity.

Having fully described a preferred embodiment of the invention and various alternatives, those skilled in the art will recognize, given the teachings herein that numerous alternatives and equivalents exist which do not depart from the invention. Therefore the invention is not limited by the foregoing description, but only by the appended claims.

What is claimed is:

1. A docking module for use with conventional small form factor disk drives, comprising:
   a housing member having a plurality of slots;
   a plurality of tray loaders for holding small form factor disk drives, each said slot being configured to receive each said tray loader;
   a connecting means for connecting said small form factor disk drive to a host, said small form factor disk drive having a first connector; said tray loader having a second connector for connecting said first connector of said small form factor disk drive, a third connector electrically connected to said second connector; said connecting means being a PCBA back plane having a fourth electrical connector for connecting to said host, a plurality of fifth connector for removably connecting to said third connector of said tray loader;
   a button attached to a lever mechanism for disengaging said third connector of said tray loader from said fifth connector;
   a slide means within said housing for moving said tray loader within said housing.

2. The docking module according to claim 1, wherein said tray loader has a nominal width up to 2.75 inches and a nominal depth up to 4 inches and a nominal height up to 0.8 inches.

3. The docking module according to claim 2, wherein said slide means is a slide mounted within said housing and connected to the said button, whereby said slide moves within said housing when said button is depressed.

4. The docking module according to claim 3, wherein said tray loader has an EMI shield.

5. A docking module for use with conventional small form factor disk drives, comprising:
   a housing member having a plurality of slots;
   a plurality of tray loaders for holding small form factor disk drives, each said slot being configured to receive each said tray loader;
   a connecting means for connecting said small form factor disk drive to a host, said small form factor disk drive having a first connector; said connecting means being a PCBA back plane having a second electrical connector for connecting to said host, a plurality of third connector for removably connecting to said first connector of said small form factor disk drive;
   a button attached to a lever mechanism for disengaging said first connector from said third connector;
   a slide means within said housing for moving said tray loader within said housing.

6. The docking module according to claim 5, wherein said tray loader has a nominal width up to 2.75 inches and a nominal depth up to 4 inches and a nominal height up to 0.8 inches.

7. The docking module according to claim 6, wherein said slide means is a slide mounted within said housing and connected to the said button, whereby said slide moves within said housing when said button is depressed.

8. The docking module according to claim 7, wherein said tray loader has an EMI shield.

9. A docking module for use with conventional small form factor disk drives, comprising:
   a housing member having at least two slots;
   two tray loaders for holding two small form factor disk drives, each said small form factor disk drive having a first connector, each said tray loader having a second electrical connector for electrically and removably connecting to said small form factor disk drive, a third connector electrically connected to said second connector, each said slot being configured to receive each said tray loader, said tray loader having an EMI shield, said tray loader having a nominal width up to 2.75 inches and a nominal depth up to 4 inches and a nominal height up to 0.8 inches;
   a PCBA back plane having a fourth electrical connector for connecting to said host, two fifth connectors for removably connecting to each said third connector of said tray loader;
   a button attached to a lever mechanism for disengaging said first connector of said tray loader from said third connector;
   a slide mounted within said housing and connected to said button, whereby said slide moves within said housing and carries said tray loader when said button is depressed.

10. A docking module for use with conventional small form factor disk drives, comprising:
    a housing member having at least two slots;
    two tray loaders for holding two small form factor disk drives, each said small form factor disk drive having a first connector, each said slot being configured to receive each said tray loader, said tray loader having an EMI shield and a nominal width up to 2.75 inches and a nominal depth up to 4 inches and a nominal height up to 0.8 inches;
    a PCBA back plane having a second electrical connector for connecting to a host, two third connectors for removably connecting to each said first connector of said small form factor disk drive;
    a button attached to a lever mechanism for disengaging said first connector of said tray loader from said third connector;
    a slide mounted within said housing and connected to said button, whereby said slide moves within said housing and carries said tray loader when said button is depressed.

\* \* \* \* \*